July 8, 1952  R. A. BARRETT  2,602,462
CONDENSATE UNLOADER VALVE
Filed Dec. 12, 1950  2 SHEETS—SHEET 1

INVENTOR.
Ralph A. Barrett
BY W. G. Sullivan
Attorney

July 8, 1952 — R. A. BARRETT — 2,602,462
CONDENSATE UNLOADER VALVE
Filed Dec. 12, 1950 — 2 SHEETS—SHEET 2
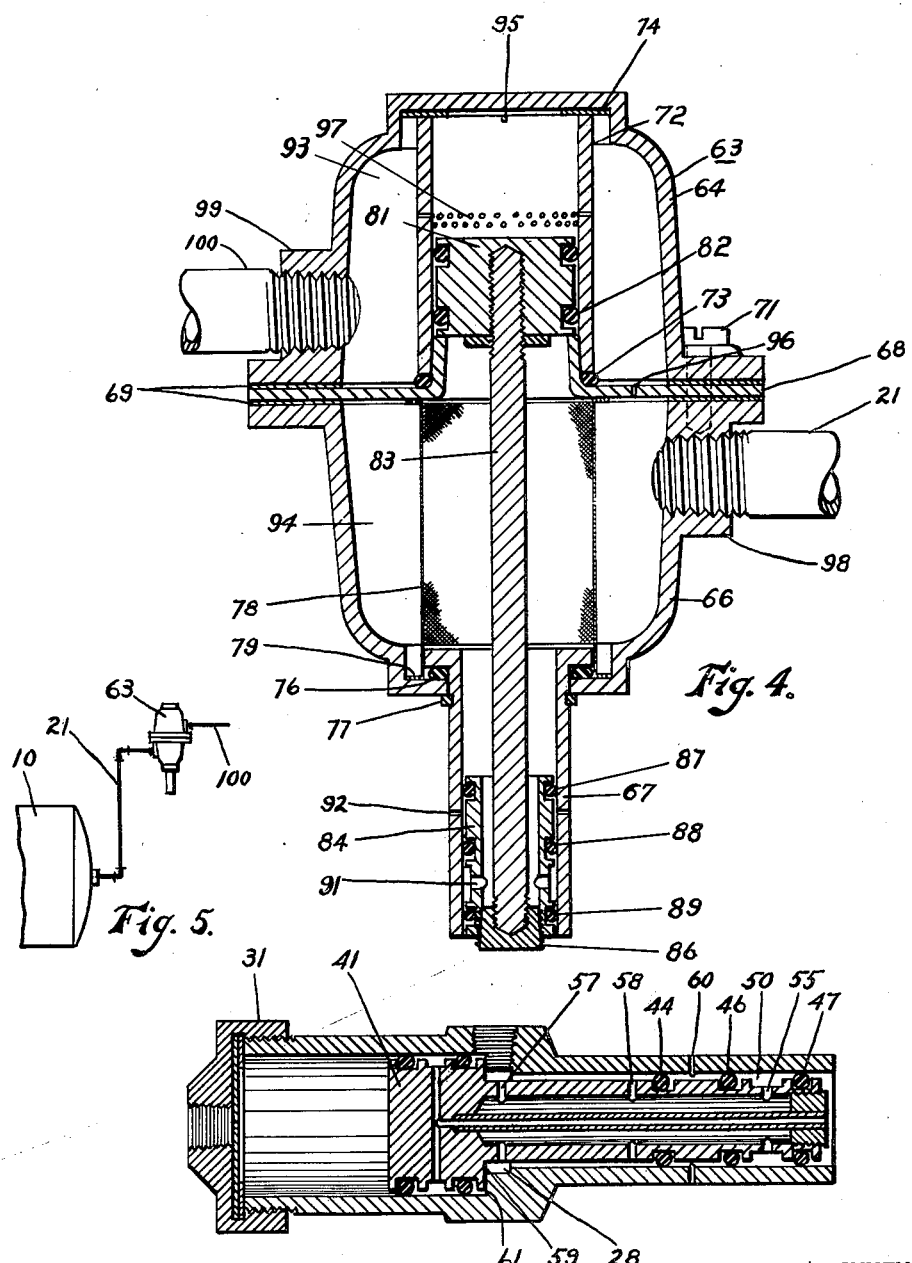
INVENTOR.
Ralph A. Barrett
BY W. G. Sullivan
Attorney Patented July 8, 1952

2,602,462

UNITED STATES PATENT OFFICE 2,602,462

CONDENSATE UNLOADER VALVE

Ralph A. Barrett, Cleveland, Ohio

Application December 12, 1950, Serial No. 200,471

13 Claims. (Cl. 137—204)

This invention relates to moisture or liquid unloading valves adapted to be associated with a conduit system for transmitting air or the like under pressure in response to intermittent demands, and more particularly to a valve of this type adapted to automatically discharge liquid from the conduit system at the initiation and termination of said demands.

The valve to be described is particularly adapted to remove water and/or oil from an air compressor conduit system or from a conduit transmitting compressed air to a work station. It is well known that moisture or liquid condensate collects in an air compressor tank and that serious disadvantages will result unless the condensate is frequently removed. For example, excess moisture causes corrosion in the system, damage will occur if the system is subjected to freezing temperatures, moisture laden air is highly objectionable in paint spraying processes, and water or oil in an air stream employed at a work station for various purposes such as for cleaning surfaces of dust, chips and the like is highly undesirable.

Continual removal of water and oil vapor from an air compressor tank will keep the tank at full air capacity and reduce the number of times the compressor must operate to maintain a desired pressure. This results in less power and oil vapor in the lines. The net result is higher efficiency and longer life of the compressor and air tools.

According to the invention, I insert a valve in a conduit system for intermittently transmitting a gaseous fluid such as air under pressure and the valve is adapted to automatically discharge or unload liquid from the system each time the demand for gaseous fluid in the system is initiated or terminated. For example, if the valve is employed with an air compressor adapted to be intermittently started and stopped, liquid condensate will be discharged each time the compressor is started and stopped. The valve may also be employed with an air compressor adapted to be continuously operated and wherein the pressure is periodically controlled through a relief valve. The valve may be disposed in a service air line or the like at a point remote from the pressure source, such as a work station, whereby upon initiation or termination of air flow in the line at the work station liquid condensate will be discharged. It is highly desirable that a valve of this general type, particularly when associated with compressed air lines operating air brakes and the like, be adapted to only stop in a valve closed or non-venting position to avoid loss of pressure in the air line. The instant valve has a reciprocating slide valve member which vents moisture and continues to a full travel position closing communication with the vent ports when movement is initiated in either direction.

It is a primary object of the invention to provide a valve adapted to be associated with a conduit system for transmitting a gaseous fluid under pressure in response to intermittent demands and wherein the valve will be automatically operated to discharge liquid condensate in the system at initiation and cessation of the demand.

Another object of the invention is to provide a valve of the above type which will only stop in a non-venting or valve closed position.

Another object of the invention is to provide a valve of the above type which is economical of manufacture, which can be easily installed in a conventional conduit system for intermittently supplying air or the like under pressure, and which will operate efficiently with a minimum of attention.

Other objects of the invention and the invention itself will be more clearly apparent from a consideration of the following description and drawings wherein:

Figure 3 is a view similar to Figure 2 with the slide valve member in the opposite extreme position.

Figure 4 is a medial sectional view of a modification of the valve illustrated in Figure 2, and Figure 5 is a fragmentary diagrammatic view showing the valve illustrated in Figure 4 inserted in an air service line.

Figure 1:
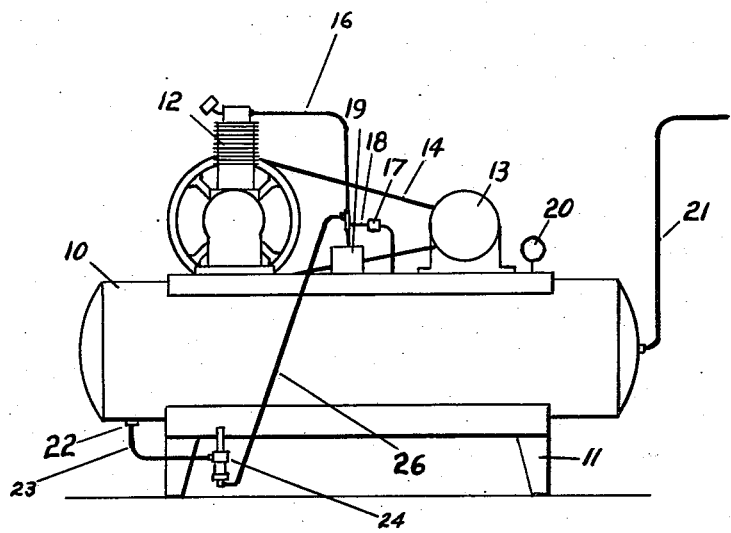
Figure 1 is an elevational view, largely diagrammatic, of an air compressor system having in association therewith a valve embodying the invention.

Referring now to the drawings, and particularly to Figure 1, I have indicated at 10 a conventional tank for receiving air under pressure, the tank being supported by a suitable frame 11. Mounted on tank 10 is an air compressor 12 driven from a motor 13 through a belt 14. Air from the compressor is delivered under pressure to pipe 16 and then through a check valve 17 inserted in a pipe 18 to tank 10. At 19 I have indicated a combined compressor unloader and pressure responsive switch. The switch is responsive to the pressure in pipe 16 whereby when demand for air from tank 10 ceases, the increased pressure in pipe 16 upon reaching a predetermined value will cause the switch to break the circuit to motor 13 and stop operation of the compressor. When the compressor ceases to operate, the unloader in a well known manner will automatically reduce the pressure in pipe 16 to atmospheric pressure. Tank 10 is equipped with a pressure gauge 20 and air under pressure is delivered from the tank through a service pipe 21.

The tank 10 is equipped with a drain 22 which would normally be connected to a manually operable drain valve whereby liquid condensate in the tank would be periodically drained. However, as previously pointed out if the compressed air is intended to be used with paint spraying apparatus, surface cleaning apparatus, apparatus which is subjected to freezing temperature, and the like wherein air with a minimum amount of entrained water is constantly required it is impractical to have an operator available to operate the drain valve at frequent intervals. Further, if an operator is available negligence on his part may result in considerable damage. The compressor and associated parts so far described are conventional and are merely illustrative of the type of gaseous fluid conduit system to which a valve embodying the invention may be applied.

To avoid the disadvantages of a manually operable drain valve I connect a pipe 23 leading from the tank drain 22 with a valve, generally indicated at 24, which embodies the invention. Valve 24 is also connected by a pipe 26 with the pipe 16 which effects communication between the compressor 12 and the tank 10.

Figure 2:
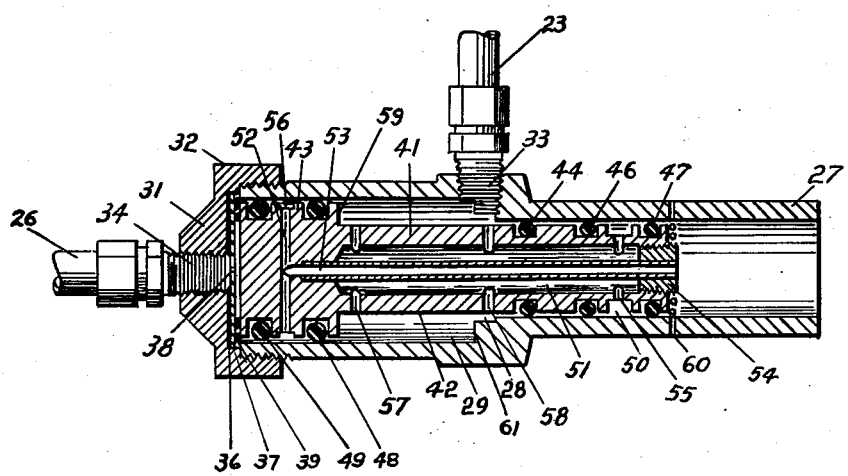
Figure 2 is an enlarged longitudinal medial sectional view of the valve illustrated in Figure 1, with the slide valve member thereof in one extreme position.

The structure and operation of valve 24, as best illustrated in Figures 2 and 3, will now be explained. The valve comprises a tubular housing having a portion 27 provided with a cylindrical bore, a relatively short portion 28 provided with a slightly enlarged cylindrical bore, and a portion 29 provided with a further enlarger cylindrical bore. Portion 28 in preferably of hexagonal contour externally for engagement with a wrench and portion 29 is externally threaded at the end thereof to detachably engage a cap 31. The external surface 32 of cap 31 is also preferably hexagonal in contour for engagement with a wrench. Portion 28 of the housing has a lateral threaded opening 33 therein for sealing connection with pipe 23. Cap 31 has an axial threaded opening 34 therein for sealing engagement with pipe 26. It will be noted that cap 31 is formed with an annular surface 36 against which a disc 37 formed of rigid material abuts, the disc having a relatively small central opening therein as indicated at 38. Abutting disc 37 is a rubber or the like sealing ring 39.

An inner cylinder forms a slide valve member, generally indicated at 41. Member 41 comprises a cylindrical portion 42 which makes a sliding fit with portion 27 of the housing and an enlarged cylindrical portion 43 making a sliding fit with portion 29 of the housing. Portion 42 of member 41 is circumferentially grooved at three axially spaced points to receive rubber or the like sealing rings indicated at 44, 46 and 47. Portion 43 of member 41 is similarly grooved to receive sealing rings indicated at 48 and 49. The valve member is formed to provide an axial chamber 51 substantially co-extensive with portion 42 thereof and a relatively small step-shouldered axial bore extends from chamber 51 to a transverse passage 52 in the valve member enlarged portion 43. A relatively small diameter tube 53 has one end seated in said bore and its opposite end seated in a plug 54 which threadedly engages the small end of member 41. Also, the valve member is grooved between sealing rings 46 and 47 to provide an annular passage 50 which communicates with chamber 51 through one or more ports 55. A plurality of radial liquid discharge ports 60 are provided in the wall of housing portion 27.

The enlarged portion 43 of the valve member is circumferentially grooved between rings 48 and 49 to provide an annular passage 56 communicating with transverse passage 52 and resultantly with tube 53. Valve member portion 42 is drilled at axially spaced points to provide ports indicated at 57 and 58 effecting communication with chamber 51 through the valve member wall.

The manner in which the valve illustrated in Figure 2 will function to automatically unload liquid condensate from an air compressor system of the general type illustrated in Figure 1 will now be explained. The valve 24 embodying the invention is only adapted to systems where there is an intermittent demand for air or the like under pressure as in supplying air for air brakes, inflating tires, paint spraying, operating pressure grease systems, pneumatic hoists and the like, as distinguished from a system which constantly demands air under pressure for long periods such as a continuous blower system. First, assume that the demand for air through service pipe 21 has ceased and consequently pressure in tank 10 reaching its maximum setting the pressure switch has broken the electrical circuit for motor 13 causing the compressor 12 to to stop operating, and the unloader has reduced the pressure in pipe 16 to atmosphere. Since pipe 16 communicates with the large end of the valve member 41 through pipe 26 the large or left end surface of the member (Figure 2) will only be subjected to atmospheric pressure. The small or right end surface of member 41 (Figure 2) is constantly subjected to atmospheric pressure since the end of valve housing portion 27 is always open to atmosphere. When the compressor ceases to function the check valve 17 holds the pressure in tank 10 at a point considerably above atmospheric pressure and this pressure is transmitted through pipe 23 to the face 59 of member 41, representing the difference in area between the large and small ends of the valve member. In other words, under these conditions the large and small ends of the valve member are both subjected to atmospheric pressure but due to the higher pressure exerted on face 59 the valve member 41 will be moved to the position illustrated in Figure 2.

Now, assume that the air is demanded in service pipe 21 whereupon the pressure switch will cause the compressor to start operating when pressure in tank 10 is reduced to a predetermined minimum. Then, the large end of member 41 will be subjected to the pressure in pipe 16 whereas the opposing pressure will be atmospheric pressure on the small end of the member plus the tank pressure on face 59 of member 41. Obviously the valve member will be forced to the right (Figure 2) until the face 59 contacts the annular shoulder 61 of the valve housing and the valve member occupies the position of Figure 3. It will be noted that when face 59 abuts housing shoulder 61 that due to the step-shoulder form of housing portion 28 an annular passage is formed having face 59 as one wall thereof. This passage communicates with pipe 23 and when pressure in tank 10 reaches a predetermined maximum thus stopping the motor and compressor the pressure at the large end of the valve member will be reduced to atmospheric pressure, the tank pressure acting on face 59 causes the valve member to move to the left or away from housing shoulder 61 and the member 41 moves to the position illustrated in Figure 2.

Thus far I have merely explained how movement of the valve member in opposite directions is effected upon start-up or shut-down of the compressor and the manner of discharging liquid condensate by movement of member 41 will now be described. Although I have described the valve 24 in connection with a compressor which is intermittently operable it will be apparent that it is equally adaptable to a compressor which is continuously operable but which is provided with a relief valve whereby when there is no demand for air through service pipe 21, the relief valve will open to atmosphere dropping the pressure in pipe 16 substantially below the pressure in tank 10 and thereby causing the member 41 to move to the position illustrated in Figure 2 due to differential pressure on the member as previously described. As hereinbefore described when the relief valve closes due to demand for air through service pipe 21, the member 41 will be caused to move to the right (Figure 3) due to differential pressure thereon. Relief valves of the type contemplated herein are well known and a detailed description thereof is not believed to be necessary. The manner of effecting valve member movement has been explained and if the member 41 is in the position of Figure 2, liquid condensate from tank 10 will pass through pipe 23 into the annular space defined by the inner wall of housing portion 29, the outer wall of valve member portion 42, the face 59, and the annular shoulder 61 of the housing. Liquid condensate may pass into chamber 51 through ports 57 and 58 and from the chamber through port 55 into annular passage 50. As the member moves to the right passage 50 will be brought into alignment with discharge ports 60 and the liquid will be quickly discharged to atmosphere or to a suitable receiver. As previously explained, the valve member or chamber will be moved to the right when there is a demand for increased air pressure in tank 10 and when face 59 contacts housing shoulder 61 as illustrated in Figure 3, annular passage 50 will have moved to the right beyond housing discharge ports 60 and the discharge ports will be covered by the member portion intermediate the sealing rings 44 and 46. At this time ports 57 and 58 of the valve member are in communication with tank drain pipe 23 and liquid condensate will be forced into chamber 51 under tank pressure. When the demand for air pressure in tank 10 ceases, the valve member will start moving to the left and when passage 50 is again aligned with discharge ports 60 a further discharge of liquid condensate will occur. Thus, condensate is discharged both upon initiation of demand for air in pipe 21 and upon termination of such demand whereby an air supply system subject to intermittent demands is automatically maintained substantially free of moisture or liquid condensate.

I contemplate that additional ports may be drilled through the wall of portion 42 of member 41 between ports 57 and 58 or the wall of portion 42 extending from ports 57 and 58 may be omitted and a cylindrical screen substituted therefor. In the event a cylindrical screen is employed I preferably form portions 42 and 43 of member 41 as separate parts and inter-connect these portions by threading tube 53 into portion 43 and forming portion 42 with an integral end wall (in place of plug 54) through which the opposite end of tube 53 is threaded.

Inasmuch as liquid may penetrate between the sealing rings 48 and 49 I provide the transverse passage 52 communicating with tube 53 and resultantly to atmosphere to discharge liquid trapped between these rings. The provision of two sealing rings 48 and 49 for enlarged portion 43 of valve member 41 and an intermediate passage 56 communicating with atmosphere is important. As previously pointed out, the face 59 of valve member 41 is continuously subjected to tank pressure or high pressure whereas the pressure at the large or left hand end of the valve member will be intermittently reduced to atmospheric pressure. Under these conditions liquid condensate and/or oil vapor from tank 10 entering the housing of valve 24 through pipe 23 may be forced past sealing ring 48 and if only one sealing ring is used the liquid would be forced into pipe 26. In fact, I found by experiment that if only one sealing ring is employed after a period of several months pipe 26 may become entirely filled with liquid and prevent proper functioning of the compressor-unloader unit. With the arrangement disclosed any liquid forced by sealing ring 48 is trapped by the second sealing ring 49 and drained through passages 56, 56 and tube 53. To prevent sudden movement of the valve member 41 to the left or shock contact of the member with the housing cap I provide the relatively small or restricted opening 38 in disc 37 which in a well known manner retards member movement. It will be noted that the valve housing, cap 31, and the valve chamber member are adaptable to being primarily formed by automatic screw machine operations. I preferably use hexagonal bar stock for the cap and housing.

The rubber sealing or O rings are inserted in the grooves provided therefor in the external walls of the member and after member 41 is disposed in the housing, the valve is assembled by threading cap 31 to the housing. It will be apparent that the valve described is economical of manufacture and can be adapted to a conventional air compressor system adapted to intermittently supply air under pressure, merely by substituting the valve 24 for a conventional manually operated drain valve through connection of valve opening 33 with the tank drain pipe and extending a pipe 26 from valve opening 34 to a point in the air line between the compressor-unloader and compressor.

Referring now to Figure 4, I have shown a modification of the valve illustrated in Figures 2 and 3. The valve generally indicated at 63 has a housing formed by an upper part 64 of inverted cup form, a lower cup form part 66, and a tube 67 depending from part 66. Parts 64 and 66 are formed with outwardly extending radial flanges and the flange of an element 68 is gripped therebetween. Sealing rings 69 are disposed between the flanges and the flanges are secured together in any suitable manner as by screws 71. Element 68 has an upstanding neck portion over which is telescoped the lower end of a cylinder 72. The lower end of the cylinder is sealed with element 68 as by a sealing ring 73 and the upper end is sealed with housing part 64 as by a gasket 74.

Tube 67 is sealingly connected to lower housing part 66 in any suitable manner as by providing an outwardly radial flange at the tube upper end and clamping a sealing ring 76 between the tube flange and the base of part 66 by a snap ring 77 seating in a groove in the tube. Extending from element 68 to the base of part 66 is a cylindrical screen 78, the screen preferably being formed with a radial flange 79 at its base for centering the screen in part 66. A piston 81 provided with sealing rings 82 which may be rubber O rings as shown or split metal rings is reciprocable in cylinder 72 and has a rod 83 secured thereto. A bleed hole 95 effects communication between chamber 93 and the top zone of cylinder 72.

The rod at its lower end is secured to a tubular valve member 84 in any suitable manner as by forming a tapered plug 86 on the rod end and threading the same into the valve member thereby forming a well within the valve member. The valve is provided with sealing rings at axially spaced points as indicated at 87, 88 and 89 which are preferably rubber O rings.

Intermediate rings 88 and 89 the valve member wall is drilled in a radial plane to provide a plurality of discharge openings 91. The wall of tube 67 is also drilled in a radial plane to provide discharge ports as indicated at 92.

In effect, the flange of element 68 divides the interior of the valve housing into an upper chamber 93 and a lower chamber 94 and a bleed hole 96 provides continuous communication between the chambers. A plurality of ports 97 are formed in cylinder 72 in a position to be disposed above piston 81 in its lowermost position and to be beneath the piston in its uppermost position. Lower housing part 66 is provided with a threaded boss 98 for connection with a line such as 21 leading from an air compressor tank and the upper valve part 64 is provided with a threaded boss 99 for connection with a line 100 leading to an air tool or other apparatus intermittently demanding air under pressure. For ease in removal I contemplate that a cup form screen can be substituted for screen 78 and disposed with its axis horizontal and its open end disposed in boss 98. The screen open end would have a radial outwardly extending flange seating against annular shoulder on the boss.

The manner in which the valve illustrated in Figures 4 and 5 operates will now be described. Since lower chamber 94 is connected to tank 10 by line 21 it is continuously subjected to tank or relatively high pressure. The lower face of piston 81 and the valve member 84 are both subjected to the air pressure in chamber 94 and tend to move the rod 83 in opposite directions but the net effective area is such as to tend to move the rod in an upward direction. When the demand for air at the tool or the like associated with line 100 is cut off the air pressure in chambers 93 and 94 will quickly equalize since the chambers communicate through bleed hole 96. Under these conditions the upper face of piston 81 is subjected to the same pressure as the under face but the effective area is greater so that the piston is forced downwardly to the position illustrated in Figure 4. When air is demanded in line 100 the air pressure in chamber 93 quickly drops to a point where the piston is forced upwardly so that its lower face is above cylinder ports 97 permitting a free flow of air between lines 21 and 100. Since the area of bleed hole 96 is relatively small it cannot supply air at a rate to prevent a quick drop in pressure in chamber 93 when air is demanded in line 100.

During flow of air through valve 63 any entrained scale or solid foreign matter is filtered out of the air stream by screen 78 and collects at the base of lower valve part 66. Liquid condensate will collect in the base of part 66 and the well of valve member 84. Liquid in the valve member will be discharged to atmosphere or a receptacle when the member openings 91 are aligned with the tube discharge parts 92 or during the time the annular zone between rings 88 and 89 is in alignment with ports 92. Liquid in the valve member will be discharged both on the up and down strokes of the valve member or each time air flow starts and stops in line 100.

The manner in which valve 63 is adapted to automatically remove liquid condensate from an air service line has been described. The valve can also remove condensate from an air compressor tank such as 10 merely by connecting drain pipe 23 (Figure 1) with the valve housing lower part through boss 98 and connecting the air service line such as 21 with the valve housing upper part through a pipe extending from boss 99 to line 21 adjacent the tank. With this hook-up chamber 94 is always subjected to tank pressure and chamber 93 is alternately subjected to tank pressure and a relatively lower pressure when air flows in line 21. Thus as previously described the valve member will be reciprocated as air flow is demanded and cut off in the service line to discharge condensate from tank 10.

It will be noted that in both the valves illustrated in Figures 2 and 4 the valve member cuts off communication with the discharge ports to atmosphere in either of its extreme positions. Also, it will be noted that when movement of the valve member is initiated in either direction it continues to its other extreme position. It is particularly important in air brake systems that air pressure is not reduced through continuous venting of a moisture unloader valve in the system and the instant valve prevents continuous venting of air. It will be noted that both the valves illustrated have a cylinder in which a piston is reciprocable, a tubular portion in which a slide valve member fixed to the piston is reciprocable, the slide valve member has a chamber or well for receiving condensate and adapted to be continuously subjected to relatively high pressure, and that the well is adapted to temporarily communicate with atmosphere during reverse movements of the valve member.

I wish it to be understood that I do not desire to be limited to the exact details of construction shown and described, for obvious modification will occur to persons skilled in the art.

What I claim is as follows:

1. A liquid unloading valve adapted to be inserted in a conduit system for supplying gaseous fluid under pressure in response to intermittent demands, the valve being adapted to discharge liquid entrained in the gaseous fluid upon initiation and cessation of such demands, said valve comprising a tubular housing having an opening therein adapted to communicate with gaseous fluid under substantially constant high pressure and a second opening adapted to communicate with gaseous fluid under variable pressure, a cylindrical slide valve member in the housing having a piston integral therewith, with one face of the piston communicating with the constant pressure opening and the other face communicating with the variable pressure opening, the valve member being adapted to move in one direction when the variable pressure changes in response to cessation of demand for gaseous fluid and to move in the opposite direction when the variable pressure changes in response to demand for gaseous fluid, the slide valve member having a longitudinally extending chamber therein, means effecting continuous communication between said chamber and the constant pressure opening whereby liquid entrained in the gaseous fluid may be directed to the chamber, the valve housing having liquid discharge means therethrough, the valve member having liquid discharge means communicating with the chamber therein, and both said liquid discharge means being adapted to be aligned when the valve member moves in either direction relative to the valve housing whereby liquid will be discharged from the valve upon initiation and cessation of demand for gaseous fluid.

2. A liquid unloading valve for a system adapted to deliver air under substantially constant pressure in response to intermittent demands on the system, said valve comprising a tubular housing having a first opening therein adapted to communicate with a source of air under substantially constant pressure, a cylindrical slide valve member in the housing including a piston, one face of the piston being in communication with the constant pressure opening, the housing having a second opening therein adapted to be connected to a conduit for air subject to variable pressure in response to initiation and cessation of demands for air in the system, the opposite face of the piston being in communication with the variable pressure opening whereby differential pressure on the piston will cause the valve member to move in opposite directions, the valve member having an elongate chamber therein, means effecting continuous communication between said chamber and the constant pressure opening whereby liquid may be delivered to said chamber, the housing having transversely aligned liquid discharge openings therein, and the valve member having liquid discharge ports from the chamber whereby when the discharge ports are aligned with the discharge openings upon movement of the valve member in either direction liquid will be discharged from the chamber through said housing.

3. A liquid unloading valve adapted to be associated with an air compressor system of the type comprising a tank, a liquid drain for the tank, a compressor, and an air supply pipe leading from the compressor to the tank adapted to have the pressure therein reduced substantially below tank pressure upon cessation of demand for air from the tank, said valve comprising a tubular housing having an enlarged cylindrical bore extending to a reduced cylindrical bore, a cylindrical slide valve member in the housing having a tubular portion slidable in the housing reduced bore and an enlarged piston portion slidable in the housing enlarged bore, the housing having a first opening therein adapted to effect communication between the tank drain and one face of the piston portion, the housing having a second opening therein adapted to effect communication between the tank air supply pipe and the opposite face of the piston portion whereby the valve member will be moved in opposite directions in response to differential pressure between the tank and said air supply pipe, the valve member tubular portion wall having an entry opening effecting constant communication with the housing first opening whereby liquid from the tank may be delivered to the interior of the tubular portion, the said tubular portion wall having a liquid discharge opening axially spaced from the entry opening, and the housing having liquid discharge ports whereby liquid will be discharged from the valve when the valve member discharge opening is aligned with said discharge ports upon movement of the valve member in either direction.

4. A liquid unloading valve for use with systems supplying gaseous fluid under pressure, said valve comprising a tubular housing open to atmosphere at one end and closed at its opposite end, the housing being formed to provide an enlarged cylindrical bore extending from its closed end and a reduced co-axial cylindrical bore extending to its open end, the housing closed end being adapted to communicate with a source of gaseous fluid under variable pressure, the housing having an opening in the side wall thereof at the juncture of the enlarged and reduced bores therein adapted to communicate with a source of gaseous fluid under substantially constant pressure, the housing having a plurality of radial liquid discharge ports at a transverse plane adjacent the open end thereof, a cylindrical slide valve member in the housing having a tubular portion slidable in the housing reduced bore and a piston slidable in the housing enlarged bore, the tubular portion providing an elongate closed chamber in the valve member, the valve member having openings in the chamber wall effecting continuous communication between the chamber and the housing side wall opening, and the chamber walls having liquid discharge openings therein adapted to be aligned with the housing discharge ports during travel of the valve member.

5. The liquid unloading valve as described in claim 4 and wherein sealing rings are mounted in the valve member at each side of the chamber liquid discharge openings, and the tubular portion of the valve member is formed with an external groove forming an annular passage communicating with said discharge openings.

6. The liquid unloading valve as described in claim 4 and wherein the valve member piston has axially spaced sealing rings mounted therein, the piston is grooved to form an annular passage between said rings, a tube extends from the piston through the valve member chamber to atmosphere, and the piston is formed with a transverse passage connecting said annular passage and tube.

7. The liquid unloading valve as described in claim 4 and wherein the housing closed end comprises a detachable cap adapted to engage a conduit, a sealing ring, and a disc having a restricted orifice whereby valve member movement towards the closed end of the housing will be retarded.

8. A liquid unloading valve comprising a cylinder, a tubular portion of reduced cross-sectional area relative to the cylinder and axially aligned therewith, a piston reciprocable in the cylinder, a slide valve member reciprocable in the tubular portion and fixed to the piston, the valve member having a well therein adapted to continuously communicate with a gaseous fluid under relatively high pressure and to receive liquid condensate, one face of the piston having less effective area than the opposite face and said one face being adapted to be continuously subjected to said high pressure, the said opposite piston face being adapted to be intermittently subjected to relatively high and low pressure whereby the piston and valve member will be reciprocated due to differential force on the piston, and means effecting temporary communication between the valve member well and atmosphere during movement of the valve member in either direction whereby condensate may be discharged.

9. A liquid condensate unloading valve for air compressor systems adapted to be inserted in any system wherein a first connection can be made with a source of substantially constant relatively high pressure and a second connection can be made with a line intermittently having a pressure generally corresponding to said high pressure and a relatively lower pressure, said valve comprising a housing including a cylinder, a tubular portion axially aligned with the cylinder and of reduced cross-sectional area relative thereto, a piston reciprocable in the cylinder, a hollow slide valve member in the tubular position operatively connected to the piston and adapted to receive liquid condensate from the housing, one face of the piston having a greater effective area than its opposite face whereby substantially the same air pressure on both faces will effect movement of the piston and valve member in one direction and a substantially reduced pressure on the opposite face will effect movement in the opposite direction, means for making the said first connection with the housing at a point to exert its substantially constant pressure on the said opposite piston face, means to make the said second connection with the housing at a point to exert its variable pressure on the said one piston face, the slide valve member having discharge openings at a transverse zone therein, and the tubular portion having discharge ports at a transverse zone whereby liquid condensate will be discharged from the valve when communication is effected between the discharge openings and ports during travel of the valve member in either direction.

10. The liquid unloading valve as described in claim 9 and wherein sealing rings are disposed at axially spaced points between the slide valve member and tubular portion to define an annular zone therebetween for receiving condensate to be discharged.

11. The liquid unloading valve as described in claim 9 and wherein screen means are disposed in the housing adapted to prevent entrained foreign matter in air flowing from the high pressure source from entering the interior of the slide valve member.

12. A liquid unloading valve for compressed air systems and the like comprising a housing having an upper and lower chamber therein, means for connecting the upper chamber with a line intermittently demanding air under pressure, means for connecting the lower chamber with a source of air under substantially constant high pressure, a ported cylinder encircled by the upper chamber, a reciprocable piston in the cylinder adapted to move from a position effecting communication between the chambers through the cylinder ports to a position cutting off communication, a bleed port between the chambers, the lower face of the piston subjected to pressure in the lower chamber having less effective area than its upper face whereby when air demand from the upper chamber ceases the chamber pressures quickly equalize forcing the piston downwardly to cut off communication between the chambers and when demand initiates the piston moves upwardly due to lower pressure in the upper chamber to effect communication between the chambers, a hollow slide valve member operable by the piston adapted to receive liquid condensate from the lower chamber, and means for discharging said condensate to atmosphere upon reverse movements of the slide valve member.

13. A liquid unloading valve adapted to be inserted in an air supply conduit subjected to intermittent demands, said valve comprising a tubular housing having an air entry port, a cylinder in the housing, a piston in the cylinder, the cylinder having an opening in continuous communication with the air entry port, the cylinder having an air discharge port adapted to connect with a conduit for intermittently supplying air, the piston being movable in opposite directions in response to initiation and cessation of air demand at the discharge port whereby upon air demand the piston will move to a position effecting communication between the entry and discharge ports and upon cessation of demand the piston will move to a position cutting off communication between said ports, the housing having a depending reduced tubular portion co-axial with the cylinder, a slide valve member in the housing reduced portion rigidly connected to the piston and adapted to receive liquid condensate from the housing, the valve member having liquid discharge openings at a transverse plane, and the housing reduced portion having ports adapted to discharge liquid when the valve member openings are aligned therewith upon movement of the valve member in opposite directions.

RALPH A. BARRETT.

REFERENCES CITED

The following references are of record in the file of this patent:

UNITED STATES PATENTS

| Number | Name | Date |
| --- | --- | --- |
| 2,007,358 | Anger | July 9, 1935 |
| 2,059,808 | Robart et al. | Nov. 3, 1936 |
| 2,418,440 | White et al. | Apr. 1, 1947 |